US012638560B1

(12) United States Patent
Delaney et al.

(10) Patent No.: US 12,638,560 B1
(45) Date of Patent: May 26, 2026

(54) ALIGNMENT SYSTEM FOR SEMICONDUCTOR OPTICAL COMPONENTS OF A LIDAR SYSTEM

(71) Applicant: Aurora Operations, Inc., Pittsburgh, PA (US)

(72) Inventors: Colin Delaney, Bozeman, MT (US); James Ferrara, Oakland, CA (US); Yongxuan Liang, Fremont, CA (US); Sen Lin, Mountain View, CA (US); Andrew Steil Michaels, Los Altos, CA (US); Lei Wang, Fremont, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 19/197,241

(22) Filed: May 2, 2025

(51) Int. Cl.
*G02B 6/42* (2006.01)
*G01S 7/481* (2006.01)
*G02B 6/293* (2006.01)

(52) U.S. Cl.
CPC .......... *G01S 7/4818* (2013.01); *G02B 6/4227* (2013.01); *G02B 6/29307* (2013.01); *G02B 6/422* (2013.01)

(58) Field of Classification Search
CPC ... G02B 6/442; G02B 6/4227; G02B 6/29307
See application file for complete search history.

(56) References Cited

U.S. PATENT DOCUMENTS

| | | | | |
|---|---|---|---|---|
| 6,266,470 B1 * | 7/2001 | Kang | ................... | G02B 6/4201 385/94 |
| 6,325,551 B1 * | 12/2001 | Williamson, III | ... | G02B 6/4219 385/91 |
| 2018/0010906 A1 * | 1/2018 | Tokushima | ............ | G01B 11/14 |
| 2018/0062748 A1 * | 3/2018 | Mack | ................. | G02B 6/4213 |
| 2022/0120976 A1 * | 4/2022 | Palone | .................... | G02B 6/30 |

* cited by examiner

*Primary Examiner* — Charlie Y Peng
(74) *Attorney, Agent, or Firm* — Dority & Manning, P.A.

(57) ABSTRACT

A method for coupling semiconductor optical components for a Light Detection and Ranging (LIDAR) system includes providing a first semiconductor optical component and a second semiconductor optical component; optically coupling a fiber array unit to the second semiconductor optical component; applying, by a vacuum component, a suction force to the second semiconductor optical component to couple the vacuum component to the second semiconductor optical component, wherein the fiber array unit is coupled to the vacuum component; and aligning the first semiconductor optical component with the second semiconductor optical component based on a measurement of light transmitted between the first semiconductor optical component and the fiber array unit via the second semiconductor optical component.

19 Claims, 7 Drawing Sheets

350

321

325

323

327

322

320

4100

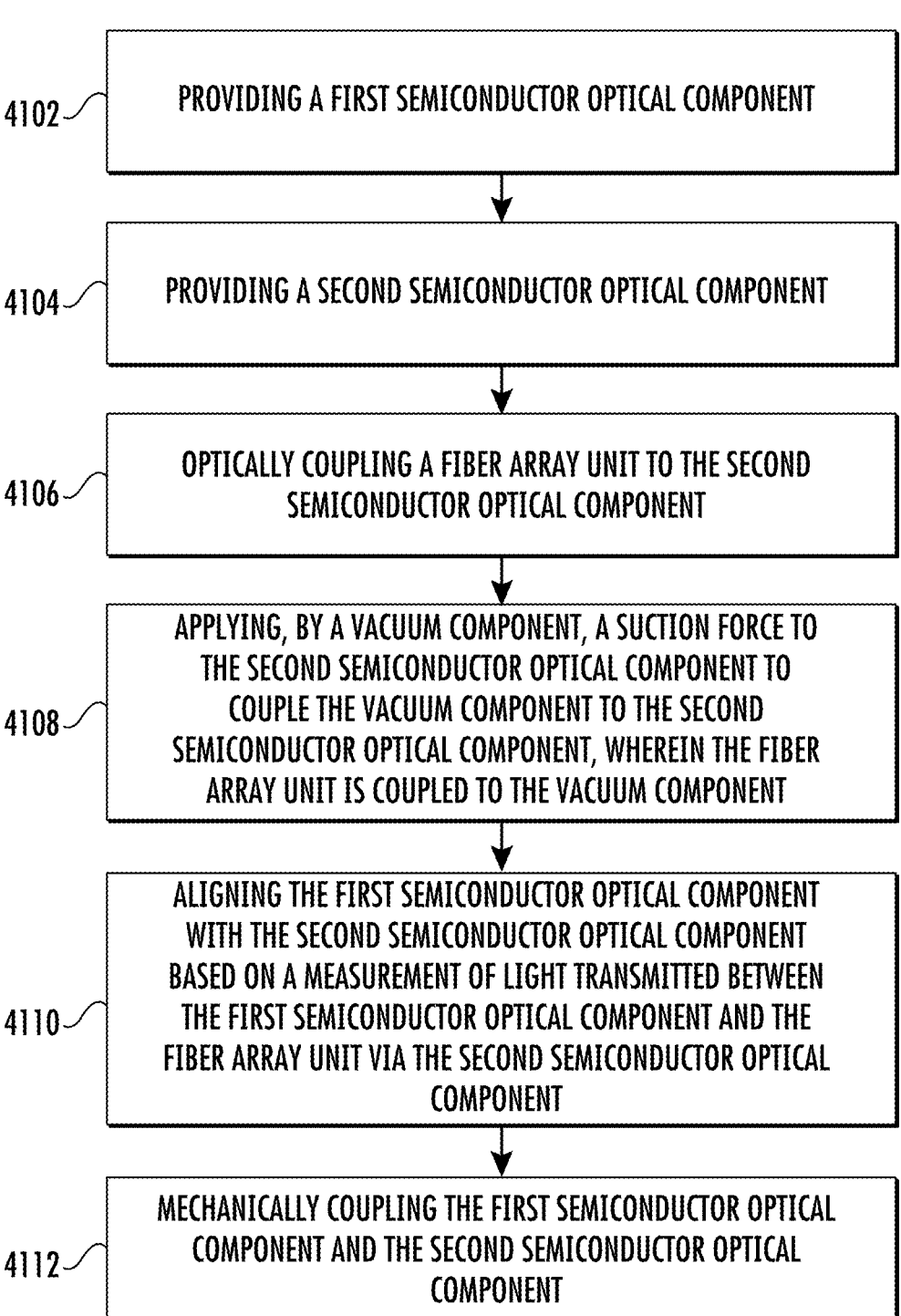

4102 — PROVIDING A FIRST SEMICONDUCTOR OPTICAL COMPONENT

4104 — PROVIDING A SECOND SEMICONDUCTOR OPTICAL COMPONENT

4106 — OPTICALLY COUPLING A FIBER ARRAY UNIT TO THE SECOND SEMICONDUCTOR OPTICAL COMPONENT

4108 — APPLYING, BY A VACUUM COMPONENT, A SUCTION FORCE TO THE SECOND SEMICONDUCTOR OPTICAL COMPONENT TO COUPLE THE VACUUM COMPONENT TO THE SECOND SEMICONDUCTOR OPTICAL COMPONENT, WHEREIN THE FIBER ARRAY UNIT IS COUPLED TO THE VACUUM COMPONENT

4110 — ALIGNING THE FIRST SEMICONDUCTOR OPTICAL COMPONENT WITH THE SECOND SEMICONDUCTOR OPTICAL COMPONENT BASED ON A MEASUREMENT OF LIGHT TRANSMITTED BETWEEN THE FIRST SEMICONDUCTOR OPTICAL COMPONENT AND THE FIBER ARRAY UNIT VIA THE SECOND SEMICONDUCTOR OPTICAL COMPONENT

4112 — MECHANICALLY COUPLING THE FIRST SEMICONDUCTOR OPTICAL COMPONENT AND THE SECOND SEMICONDUCTOR OPTICAL COMPONENT

FIG. 4

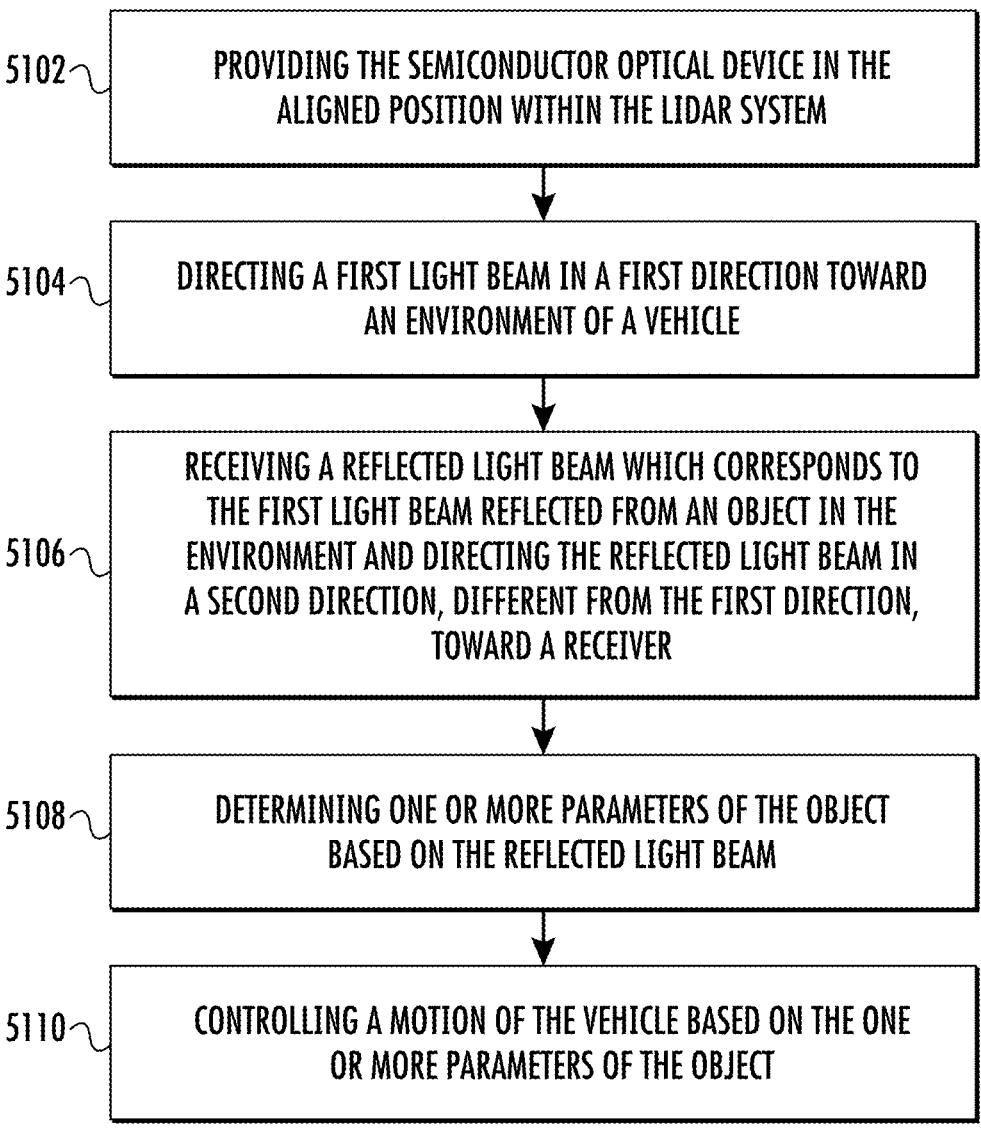

5100

5102 — PROVIDING THE SEMICONDUCTOR OPTICAL DEVICE IN THE ALIGNED POSITION WITHIN THE LIDAR SYSTEM

5104 — DIRECTING A FIRST LIGHT BEAM IN A FIRST DIRECTION TOWARD AN ENVIRONMENT OF A VEHICLE

5106 — RECEIVING A REFLECTED LIGHT BEAM WHICH CORRESPONDS TO THE FIRST LIGHT BEAM REFLECTED FROM AN OBJECT IN THE ENVIRONMENT AND DIRECTING THE REFLECTED LIGHT BEAM IN A SECOND DIRECTION, DIFFERENT FROM THE FIRST DIRECTION, TOWARD A RECEIVER

5108 — DETERMINING ONE OR MORE PARAMETERS OF THE OBJECT BASED ON THE REFLECTED LIGHT BEAM

5110 — CONTROLLING A MOTION OF THE VEHICLE BASED ON THE ONE OR MORE PARAMETERS OF THE OBJECT

ALIGNMENT SYSTEM FOR SEMICONDUCTOR OPTICAL COMPONENTS OF A LIDAR SYSTEM

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

The emitter and/or receiver often includes photonic circuitry formed on a semiconductor substrate such as a silicon die. Silicon photonics dies can provide for precise formation of the photonic circuitry through, for example, photolithography. Other optical components of a LIDAR system may also be formed on semiconductor substrates, while still others are formed on or connected to components made using other semiconductor materials such as, for example, a group III-V semiconductor, gallium arsenide (GaAs), and/or other suitable materials.

SUMMARY

Aspects and advantages of implementations of the disclosure will be set forth in part in the following description, or may be learned from the description, or may be learned through practice of the implementations.

Example aspects of the disclosure also relate to a LIDAR system including an optical system having a first semiconductor optical component coupled to a second semiconductor optical component. Example aspects of the disclosure also relate to a method of manufacturing a LIDAR system (e.g., a semiconductor optical system for a semiconductor-based LIDAR system for a vehicle), the semiconductor optical system (e.g., a semiconductor optical assembly, a photonics module, etc.) having the first semiconductor optical component coupled to the second semiconductor optical component.

To achieve the integration of many optics and photonic components into small form factor modules or systems, for example, an integrated LIDAR module, multiple semiconductor chips (silicon photonic chips, III-V chips, etc.) may be coupled directly together (e.g., butt-coupled or edge-coupled). For example, in optical and optoelectronic packaging, direct optical butt-coupling (also referred to as edge-coupling) may be used to couple a first waveguide to a second waveguide (e.g., by providing a polymer material such as a UV material, an adhesive material, etc., into a gap between the first and second waveguides). An alignment accuracy between the first and second waveguides may be required to be about two micrometers or less than one micrometer.

Examples of the disclosure relate to systems and methods for aligning semiconductor components for a LIDAR system. In particular, an alignment method can be used to butt-couple a first semiconductor component (e.g., a silicon photonics chip such as a silicon interposer chip) to a second semiconductor component (e.g., a semiconductor chip such as a III-V semiconductor chip, a semiconductor optical amplifier, etc.). The disclosure further relates to a method of manufacturing a LIDAR system (e.g., a semiconductor optical system for a semiconductor-based LIDAR system for a vehicle), the semiconductor optical system (e.g., a semiconductor optical assembly, a photonics module, etc.) having the semiconductor components which are butt-coupled according to the methods described herein, and/or an alignment system configured to receive and align the semiconductor components within the semiconductor optical system and/or resulting LIDAR system.

To achieve the integration of many optics and photonic components into small form factor modules or systems (e.g., an integrated LIDAR module), multiple semiconductor chips (silicon photonic chips, III-V chips, etc.) may be coupled directly together (e.g., butt-coupled or edge-coupled). For example, in optical and optoelectronic packaging, direct optical butt-coupling (also referred to as edge-coupling) may be used to couple a first waveguide to a second waveguide by providing a polymer material into a gap between the first and second waveguides. An alignment accuracy between the first and second waveguides may be required to be about two micrometers or less than one micrometer.

Existing methods for coupling semiconductor components together often require a gripper (e.g., a pneumatic gripper) to clamp one or more of the semiconductor components, which may be unstable and introduce uncertainty to the alignment. Further, the gripper can use a large amount of force and contact a large surface area of the semiconductor components to grip and to release the semiconductor components. Existing methods can also utilize complicated loop-back features with further components (e.g., additional fiber array units) to determine whether the butt-coupled semiconductor components are properly aligned. Accordingly, prior methods for aligning semiconductor components that are to be butt-coupled together may encounter alignment issues (e.g., degraded alignment accuracy) and require more cumbersome equipment such as a gripper that can cause misalignment between the semiconductor components.

Examples of the disclosure are directed to an alignment system for coupling semiconductor optical components for a LIDAR system together. In some implementations, the alignment system includes a first semiconductor optical component, a second semiconductor optical component, a vacuum component, and a fiber array unit (FAU) coupled to the vacuum component. For example, the first semiconductor optical component can include a semiconductor chip (e.g., a III-V semiconductor chip, a semiconductor optical amplifier, etc.). For example, the second semiconductor optical component can include a silicon photonics chip (e.g., a silicon interposer chip). In some implementations, the first semiconductor optical component is formed of a different semiconductor material than the second semiconductor optical component. The first semiconductor optical component and second semiconductor optical component can form an optical system or part of an optical system for a LIDAR system.

In some implementations, the vacuum component can be configured to apply a suction force to the second semiconductor optical component (e.g., to a first surface of the second semiconductor optical component) and the FAU may be coupled to the second semiconductor optical component (e.g., to the first surface of the second semiconductor optical component). The second semiconductor optical component can be butt-coupled to the first semiconductor optical component in a manner such that a second surface of the second semiconductor optical component is coupled to a surface of the first semiconductor optical component. In some implementations, the first surface of the second semiconductor optical component may be perpendicular to the second surface of the second semiconductor optical component. For example, the first surface may correspond to a major surface of the second semiconductor optical component, while the second surface may correspond to a side/edge surface of the second semiconductor optical component. In some implementations, the first surface of the second semiconductor optical component may be parallel to the second surface of the second semiconductor optical component. For example, the first surface and second surface of the second semiconductor optical component may be opposing edge/side surfaces.

A first example process for aligning the first semiconductor optical component with the second semiconductor optical component may include the following. In a first implementation, the first semiconductor optical component may be configured to generate or emit light through the second semiconductor optical component (e.g., in a first direction which is coplanar with the second semiconductor optical component) to the FAU. For example, the first semiconductor optical component may be configured to generate or emit light by utilizing amplified spontaneous emission (ASE) power of the first semiconductor optical component. The second semiconductor optical component may include one or more on-chip features which are configured to emit the light received from the first semiconductor optical component in an out-of-plane direction toward the FAU. For example, the one or more on-chip features may include one or more grating couplers. The FAU can include one or more channels to respectively receive the light emitted from the one or more grating couplers. In some implementations, the second semiconductor optical component includes a plurality of on-chip features and the FAU includes a plurality of channels. In some implementations, the light can be emitted from each of the grating couplers simultaneously. In some implementations, the light can be emitted from the grating couplers at different times (e.g., in a sequential manner).

The first semiconductor optical component can be aligned with the second semiconductor optical component based on a measurement of the light transmitted between the first semiconductor optical component and the FAU via the second semiconductor optical component. For example, in the first implementation the FAU can measure an output signal associated with the light emitted out of plane from the second semiconductor optical component in the direction toward the FAU (e.g., while moving the second semiconductor optical component) relative to the first semiconductor optical component. While the second semiconductor optical component is moved, the alignment system (e.g., via one or more processors) can determine a maximum peak of the output of the light, where the maximum peak is indicative of or associated with the first semiconductor optical component being aligned with the second semiconductor optical component.

In some implementations, after aligning the first semiconductor optical component with the second semiconductor optical component, the alignment system (e.g., via one or more processors) may be configured to control the vacuum component to release the suction force applied to the second semiconductor optical component. For example, the suction force can be reduced gradually so that the alignment is maintained (e.g., by reducing the suction force by less than a threshold suction force reduction rate).

A second example process for aligning the first semiconductor optical component with the second semiconductor optical component may include the following. In a second implementation, the FAU may be coupled to a light source (e.g., a laser) configured to generate or emit light through the FAU and into the second semiconductor optical component (e.g., in a first direction which is perpendicular to a first surface of the second semiconductor optical component) to the first semiconductor optical component. The second semiconductor optical component may include one or more on-chip features which are configured to emit the light received from the FAU in a second direction (e.g., an in-plane direction) toward the first semiconductor optical component. For example, the one or more on-chip features may include one or more grating couplers. The first semiconductor optical component can include one or more channels or waveguides to respectively receive the light emitted from the one or more grating couplers. In some implementations, the second semiconductor optical component includes a plurality of on-chip features and the first semiconductor optical component includes a plurality of channels or waveguides. In some implementations, the light can be emitted from each of the grating couplers simultaneously. In some implementations, the light can be emitted from the grating couplers at different times (e.g., in a sequential manner).

The first semiconductor optical component can be aligned with the second semiconductor optical component based on a measurement of the light transmitted between the first semiconductor optical component and the FAU via the second semiconductor optical component. For example, in the second implementation the first semiconductor optical component can measure an output signal associated with the light emitted from the second semiconductor optical component in the second direction toward the first semiconductor optical component (e.g., while moving the second semiconductor optical component). While the second semiconductor optical component is moved, the alignment system (e.g., via one or more processors) can determine a maximum peak of the output of the light, where the maximum peak is indicative of or associated with the first semiconductor optical component being aligned with the second semiconductor optical component.

In some implementations, after aligning the first semiconductor optical component with the second semiconductor optical component, the alignment system (e.g., via one or more processors) may be configured to control the vacuum component to release the suction force applied to the second semiconductor optical component. For example, the suction force can be reduced gradually so that the alignment is maintained (e.g., by reducing the suction force by less than a threshold suction force reduction rate).

The disclosed alignment systems and methods for manufacturing the same can be implemented to ensure that the first and second semiconductor optical components are securely and accurately coupled together, thereby improving the structural integrity of the optical components of the optical system. Further, according to the alignment systems and methods described herein, an alignment between semiconductor optical components can be improved compared to previous methods.

Example aspects of the disclosure are directed to LIDAR systems for autonomous vehicles. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

An autonomous vehicle (AV) can include a LIDAR system to assist the AV in perceiving its environment and navigating its environment. The LIDAR system can include a transceiver having a transmitter and receiver. The transmitter can condition a light beam (e.g., a laser beam) to be emitted by the LIDAR system into its environment. Similarly, the receiver can provide for receiving the light beam after it is emitted into the environment of the LIDAR system and reflected by objects in the environment. The receiver can provide the received beam to downstream components of the LIDAR system for processing, which can provide for the AV to perceive its environment. Because of the correlation between the transmitted beam and received beam, the transmitter and receiver may generally be placed in a tightly controlled positional relationship. For instance, the portion of the transmitter that emits the beam can be positioned near the portion of the receiver that receives the beam. In addition, some LIDAR systems such as coherent LIDAR systems can utilize a reference signal, such as a local oscillator (LO) signal, which passes from the transmitter to receiver without being emitted into the environment of the LIDAR system. For instance, this reference signal may be combined with the received beam to denoise or otherwise process the received beam to extract useful information. For instance, the LIDAR system can determine a distance to the object and/or velocity of the object based on the reflected beam.

The disclosure provides an improved LIDAR system, such as a coherent LIDAR system, which includes components which are properly aligned, coupled together, or positioned according to specification or tolerance requirements.

An alignment system or coupling system and a LIDAR system according to the disclosure can provide numerous technical effects and benefits. For example, an alignment method or coupling method implemented by an alignment system or coupling system as described herein can ensure that semiconductor optical devices implemented in a LIDAR system operate according to specifications and are positioned within a LIDAR system (e.g. LIDAR sensor system) according to design or specification requirements.

For instance, the LIDAR systems manufactured according to the disclosure can provide improved accuracy of object detections through properly aligned or coupled components (e.g., properly aligned semiconductor optical devices). In addition, when a plurality of semiconductor optical devices are provided, the semiconductor optical devices can be coupled together with respect to one another according to the methods described herein, thereby improving the quality of the LIDAR system (e.g., LIDAR sensor system). In this manner, LIDAR systems according to the disclosure can provide improved performance compared to some existing LIDAR systems.

Example aspects of the disclosure provide an example method for coupling semiconductor optical components for a Light Detection and Ranging (LIDAR) system. The example method includes providing a first semiconductor optical component and a second semiconductor optical component; optically coupling a fiber array unit to the second semiconductor optical component; applying, by a vacuum component, a suction force to the second semiconductor optical component to couple the vacuum component to the second semiconductor optical component, wherein the fiber array unit is coupled to the vacuum component; and aligning the first semiconductor optical component with the second semiconductor optical component based on a measurement of light transmitted between the first semiconductor optical component and the fiber array unit via the second semiconductor optical component.

In a first implementation, the method includes transmitting light from the first semiconductor optical component to the fiber array unit via the second semiconductor optical component.

In some implementations, the light is transmitted from the first semiconductor optical component to the fiber array unit via a grating coupler of the second semiconductor optical component provided at a surface of the second semiconductor optical component adjacent to the fiber array unit.

In some implementations, the light is transmitted from the first semiconductor optical component to the second semiconductor optical component along a first direction and the light is transmitted from the second semiconductor optical component to the fiber array unit along a second direction, different from the first direction, via the grating coupler.

In some implementations, the first semiconductor optical component is coupled to a first surface of the second semiconductor optical component and the vacuum component applies the suction force to a second surface of the second semiconductor optical component.

In some implementations, the first surface of the second semiconductor optical component is perpendicular to the second surface of the second semiconductor optical component.

In some implementations, the method further includes: measuring, at the fiber array unit, an output of the light transmitted from the first semiconductor optical component to the fiber array unit via the second semiconductor optical component, while moving the second semiconductor optical component; determining a particular position of the second semiconductor optical component relative to the first semiconductor optical component which is associated with an optimized value measured from the output of the light; and aligning the first semiconductor optical component with the second semiconductor optical component at the particular position.

In some implementations, the light is generated by the first semiconductor optical component and transmitted from the first semiconductor optical component to the fiber array unit via the second semiconductor optical component.

In some implementations, the light generated by the first semiconductor optical component comprises a spontaneous emission or a stimulated emission from the first semiconductor optical component.

In some implementations, the second semiconductor optical component includes one or more on-chip features which emit the light out of plane with respect to the second semiconductor optical component in a direction toward the fiber array unit, and the aligning the first semiconductor optical component with the second semiconductor optical component based on the measurement of the light transmitted between the first semiconductor optical component and the fiber array unit via the second semiconductor optical component, comprises measuring an output signal associated with the light emitted out of plane with respect to the second semiconductor optical component in the direction toward the fiber array unit.

In some implementations, the one or more on-chip features comprise a plurality of grating couplers and the fiber array unit comprises a plurality of channels to respectively receive the light emitted from the plurality of grating couplers.

In a second implementation, the method includes transmitting light from the fiber array unit to the first semiconductor optical component via the second semiconductor optical component.

In some implementations, the light is transmitted from the fiber array unit to the first semiconductor optical component via a grating coupler of the second semiconductor optical component provided between the second semiconductor optical component and the fiber array unit.

In some implementations, the light is transmitted from the fiber array unit to the second semiconductor optical component via the grating coupler along a first direction, and the light is transmitted from the second semiconductor optical component to the first semiconductor optical component along a second direction, different from the first direction.

In some implementations, the method includes measuring, at the first semiconductor optical component, an output of the light transmitted from the fiber array unit to the first semiconductor optical component via the second semiconductor optical component, while moving the second semiconductor optical component relative to the first semiconductor optical component, and aligning the first semiconductor optical component with the second semiconductor optical component based on an optimized value measured from the output of the light while moving the second semiconductor optical component relative to the first semiconductor optical component.

In some implementations, the method includes, after aligning the first semiconductor optical component with the second semiconductor optical component, controlling the vacuum component to release the suction force applied to the second semiconductor optical component by reducing the suction force by less than a threshold suction force reduction rate.

In some implementations, the first semiconductor optical component includes a semiconductor optical amplifier and the second semiconductor optical component includes a silicon photonics chip.

In some implementations, the first semiconductor optical component is formed of a different semiconductor material than the second semiconductor optical component.

Example aspects of the disclosure provide an example alignment system for manufacturing a Light Detection and Ranging (LIDAR) system. The example alignment system for manufacturing the LIDAR system can include an optical system including a first semiconductor optical component and a second semiconductor optical component. The alignment system can further include a vacuum component configured to apply a suction force to the second semiconductor optical component; a fiber array unit coupled to the vacuum component and configured to be optically coupled to the second semiconductor optical component while the vacuum component applies the suction force to the second semiconductor optical component; and one or more processors configured to measure light transmitted between the first semiconductor optical component and the fiber array unit via the second semiconductor optical component, and to control alignment of the first semiconductor optical component with the second semiconductor optical component based on the measured light.

In some implementations, the fiber array unit is integrated into the vacuum component.

Example aspects of the disclosure provide an example autonomous vehicle (AV) control system for a vehicle. The example AV control system for the vehicle includes one or more processors and a Light Detection and Ranging (LIDAR) system comprising an optical system including a first semiconductor optical component aligned with a second semiconductor optical component via the alignment system as described herein, based on the light measured by the one or more processors of the alignment system.

Example aspects of the disclosure provide an example autonomous vehicle (AV). The example AV includes an autonomous vehicle control system, the autonomous vehicle control system comprising a Light Detection and Ranging (LIDAR) system, the LIDAR system comprising: a light source configured to emit a beam to be directed toward an object in an environment of the autonomous vehicle; an optical system including a first semiconductor optical component aligned with a second semiconductor optical component via the alignment system as described herein based on the light measured by the one or more processors of the alignment system; and a receiver configured to receive a reflected beam from the object and determine an object detection associated with the object; and an autonomous vehicle controller configured to control the autonomous vehicle based on the object detection associated with the object.

Other example aspects of the disclosure are directed to other systems, methods, vehicles, apparatuses, tangible non-transitory computer-readable media, and devices for motion prediction and/or operation of a device including a LIDAR system having a LIDAR module according to example aspects of the disclosure.

These and other features, aspects and advantages of various implementations of the disclosure will become better understood with reference to the following description and appended claims. The accompanying drawings, which are incorporated in and constitute a part of this specification, illustrate implementations of the disclosure and, together with the description, serve to explain the related principles.

BRIEF DESCRIPTION OF THE DRAWINGS

FIGS. 4-5 illustrate flow diagrams of example, non-limiting computer-implemented methods, according to one or more example embodiments of the disclosure.

DETAILED DESCRIPTION

The following describes the technology of this disclosure within the context of a LIDAR system and an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
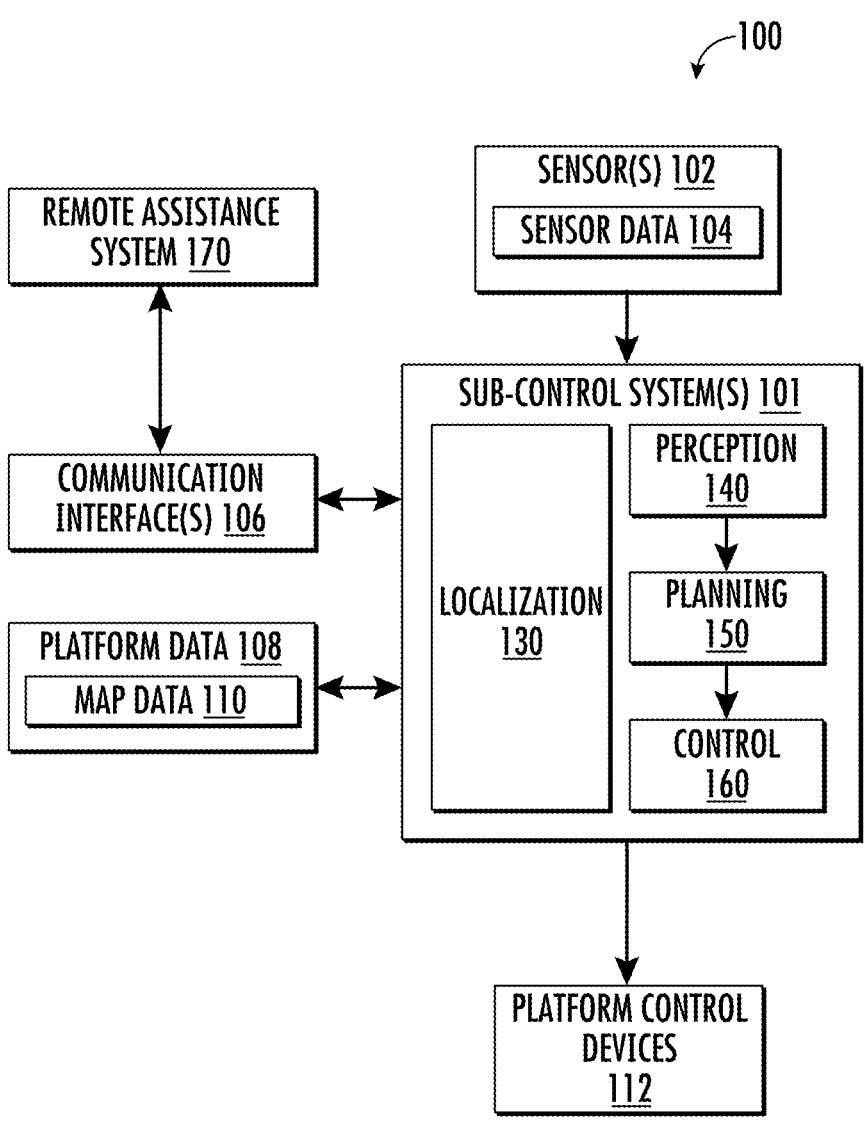
FIG. 1 depicts a block diagram of an example system, according to some implementations of the disclosure.

With reference to FIGS. 1-5, example implementations of the disclosure are discussed in further detail. FIG. 1 depicts a block diagram of an example autonomous vehicle control system 100 for an autonomous vehicle according to some implementations of the disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally, or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally, or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine the current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within the surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally, or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select the highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally, or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning system 150. Additionally, or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
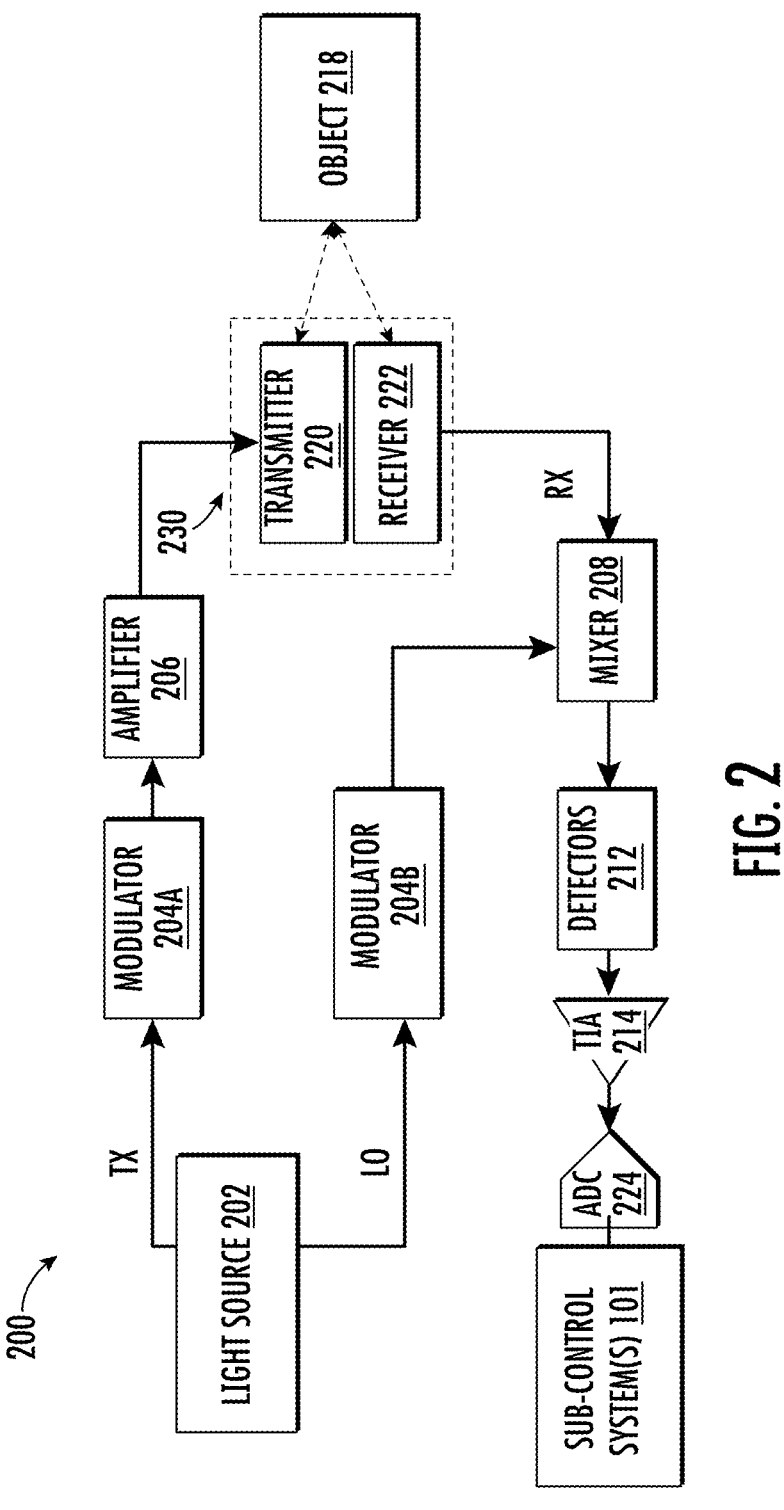
FIG. 2 depicts a block diagram of an example LIDAR system, according to some implementations of the disclosure.

FIG. 2 is a block diagram illustrating an example LIDAR system for autonomous vehicles, according to some implementations. The environment includes a LIDAR system 200 that includes a transmit (Tx) path and a receive (Rx) path. The Tx path includes one or more Tx input/output ports (e.g., channels), and the Rx path includes one or more Rx input/output ports (e.g., channels). In some implementations, a semiconductor substrate and/or semiconductor package may include the Tx path and/or the Rx path. In some implementations, the semiconductor substrate and/or semiconductor package may include at least one of silicon photonics circuitry, programmable logic controller (PLC), or group III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR system 200 can be coupled to one or more sub-control system(s) 101 (e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The Tx path may include a light source (e.g., laser source) 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs) 224. Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal for transmission via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The LIDAR system 200 includes one or more transmitters 220 and one or more receivers 222. The transmitter(s) 220 and/or receiver(s) 222 can be included in a transceiver 230. The transmitter(s) 220 can provide the transmit beam that it receives from the Tx path into an environment within a given field of view toward an object 218. The one or more receivers 222 can receive a received beam reflected from the object 218 and provide the received beam to the mixer 208 of the Rx path. The one or more receivers 222 may include one or more optical waveguides or antennas. In some arrangements, the one or more transceivers 230 may include a monostatic transceiver or a bistatic transceiver.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., $5 \times 10\text{-}12$ Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA 214 via the one or more ADCs 224.

Figure 3A:
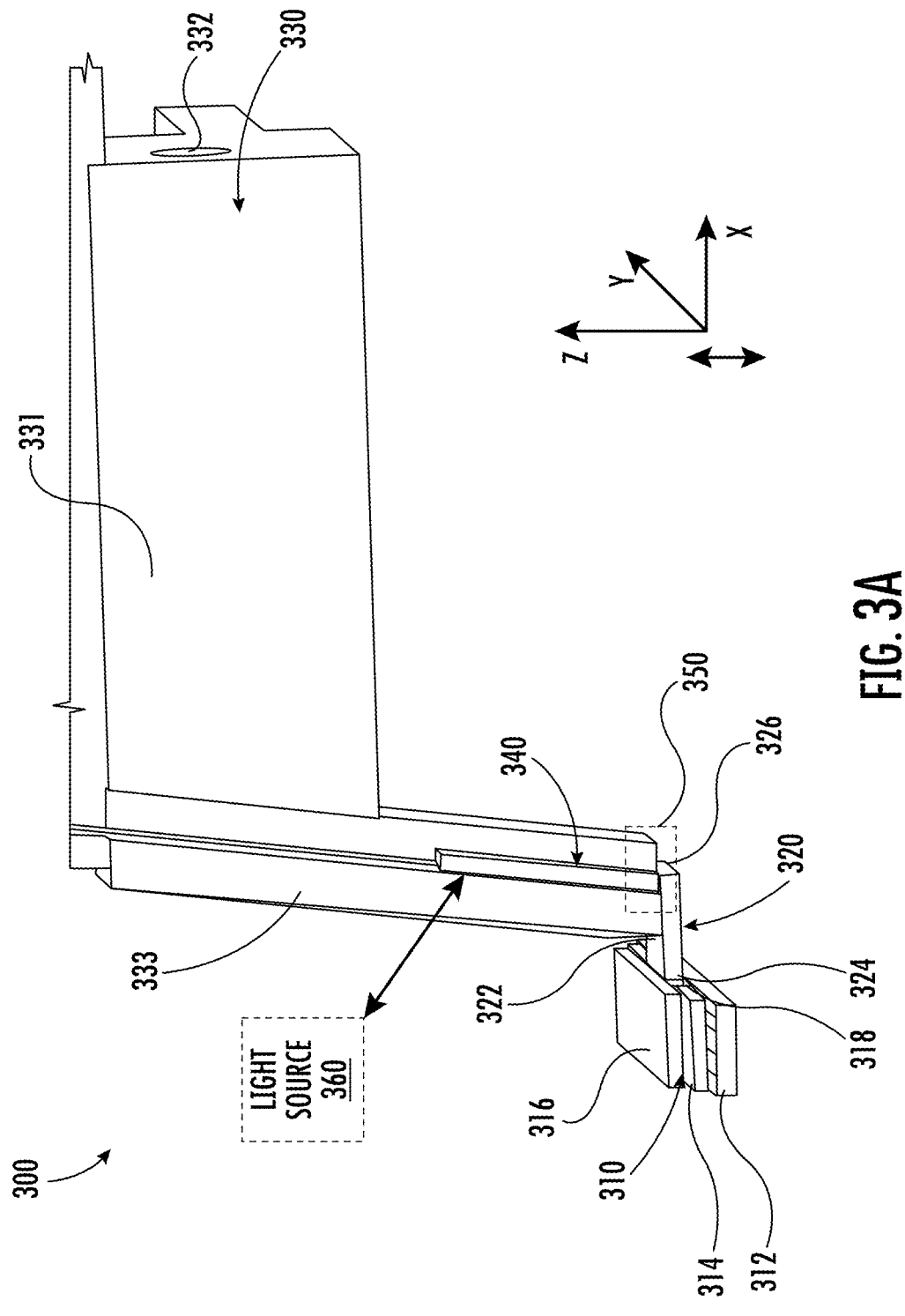
FIG. 3A depicts an example optical system for a LIDAR system, according to some implementations of the disclosure.

FIG. 3A depicts an alignment system 300 for manufacturing a LIDAR system, according to some implementations of the disclosure. The alignment system 300 can be utilized to align and couple a plurality of semiconductor optical components which can form at least part of an optical system included in a LIDAR system, such as the LIDAR system 200 of FIG. 2 and the like. For example, first and second respective semiconductor optical components described with respect to alignment system 300 can correspond to first and second different components of LIDAR system 200 of FIG. 2.

In FIG. 3A, the alignment system 300 may include a first semiconductor optical component 310 and a second semiconductor optical component 320 that are butt-coupled (or edge-coupled) together, a vacuum component 330, and a fiber array unit (FAU) 340 attached to the vacuum component 330. For example, the FAU may be pre-attached or mounted to the vacuum component 330. In some implementations, the alignment system 300 may optionally include a light source 360. The first semiconductor optical component 310 can include a semiconductor chip (e.g., a III-V semiconductor chip, a semiconductor optical amplifier, etc.) with one or more waveguides. In some implementations, the first semiconductor optical component 310 can include a plurality of layers (e.g., a first layer 312, a second layer 314, and a third layer 316) which can include one or more of a semiconductor optical amplifier, a substrate, carrier, heat spreader, or other types of electrical and/or thermal layers, etc.

In some implementations, the first semiconductor optical component 310 can be formed of a different semiconductor material than the second semiconductor optical component 320. The first semiconductor optical component 310 and second semiconductor optical component 320 can form an optical system or part of an optical system for the LIDAR system.

In some implementations, the first semiconductor optical component 310 corresponds to or includes a semiconductor optical amplifier (SOA) chip that includes optical components forming the amplifier 206 such as depicted in FIG. 2. In such implementations, the first semiconductor optical component 310 can include a plurality of respective semiconductor optical amplifiers (SOAs) configured in an array. One or more of the SOAs in the array are configured for pre-amplification of a light source at a first level of amplification, while multiple additional SOAs form amplification for a plurality of output channels at a second level of amplification. In some instances, the second level of amplification is greater than the first level of amplification. In some examples, the first semiconductor optical component 310 can also include an integrated light source such as light source 202 of FIG. 2 and/or an integrated modulator 204A, 204B on chip.

In some implementations, the second semiconductor optical component 320 corresponds to or includes a silicon photonics chip such as a photonic integrated circuit (PIC) chip or a silicon interposer chip. In such implementations, the second semiconductor optical component 320 may be made out of silicon, silicon nitride, silicon dioxide, or some combination thereof. In some examples, the second semiconductor optical component 320 can include one or more waveguides that carry light received from the first semiconductor optical component 310 to the FAU 340 and/or carry light received from the FAU 340 to the first semiconductor optical component 310.

The alignment system 300 of FIG. 3A can be utilized to establish an alignment positioning between the first semiconductor optical component 310 and the second semiconductor optical component 320 such that they may be subsequently mechanically coupled together, for example, via a coupling material provided between the first semiconductor optical component 310 and the second semiconductor optical component 320. For example, the coupling or bonding material may be a polymer material such as an ultraviolet polymer material, an epoxy such as an ultraviolet epoxy, glue, etc.

The vacuum component 330 can include a main body 331 having a suction hole 332 and an extension arm 333 for positioning relative to second semiconductor optical component 320. An air channel is formed within vacuum component 330 between suction hole 332 and another opening formed at the end of extension arm 333. When a suction force (e.g., via suction hole 332) is applied to the vacuum component 330, a corresponding suction force is generated at the end of extension arm 333, creating a temporary coupling of the second semiconductor optical component to the extension arm 333 of the vacuum component 330.

The vacuum component 330 and the FAU 340 may be mechanically coupled together, for example, via a coupling material provided between the vacuum component 330 and the FAU 340. For example, the coupling or bonding material may be a polymer material such as an ultraviolet polymer material, an epoxy such as an ultraviolet epoxy, glue, etc. In some examples, the FAU 340 includes a first channel coupled to a first side of the extension arm 333 of the vacuum component 330 (visible in FIG. 3A) and a second channel coupled to a second opposing side of the extension arm 333 of the vacuum component 330 (not visible in FIG. 3A).

In some implementations, the vacuum component 330 can be configured to apply a suction force (e.g., via suction hole 332) to the second semiconductor optical component 320 (e.g., to a first side or first surface 322 of the second semiconductor optical component 320) and the FAU 340 may be coupled to the second semiconductor optical component 320 (e.g., to the first side or the first surface 322 of the second semiconductor optical component 320) when the suction force is applied to the second semiconductor optical component 320. The second semiconductor optical component 320 can be butt-coupled to the first semiconductor optical component 310 in a manner such that a second side or second surface 324 of the second semiconductor optical component 320 is coupled to a first side or first surface 318 of the first semiconductor optical component 310. In some implementations, the first side or first surface 322 of the second semiconductor optical component 320 may be perpendicular to the second side or second surface 324 of the second semiconductor optical component 320. For example, the first side or first surface 322 may correspond to a major surface of the second semiconductor optical component 320, while the second side or second surface 324 may correspond to a side/edge surface of the second semiconductor optical component 320.

In some implementations, the vacuum component 330 can be configured to apply a suction force (e.g., via suction hole 332) to a different side or surface of the second semiconductor optical component 320 other than that shown in the example of FIG. 3A. For example, the vacuum component 330 can be configured to apply a suction force to a third side or third surface 326 of the second semiconductor optical component 320 (which may be parallel to the second side or second surface 324) of the second semiconductor optical component 320, and the FAU 340 may be coupled to the second semiconductor optical component 320 (e.g., to the third side or the third surface 326 of the second semiconductor optical component 320) when the suction force is applied to the second semiconductor optical component 320. For example, the first side or first surface 322 and third side or third surface 326 of the second semiconductor optical component 320 may be opposing edge/side surfaces.

A first example process for aligning the first semiconductor optical component 310 with the second semiconductor optical component 320 may include the following. In a first implementation, the first semiconductor optical component 310 may be configured to generate or emit light through the second semiconductor optical component 320 in a first direction (e.g., the x-direction or a direction substantially parallel to the x-direction) which is coplanar with the second semiconductor optical component 320, and the second semiconductor optical component 320 may be configured to emit the light out of plane in a second direction (e.g., the z-direction or a direction substantially parallel to the z-direction) to the FAU 340. The second direction may be different from the first direction and can be perpendicular or substantially perpendicular to the first direction. The first semiconductor optical component 310 may be configured to generate or emit light and transmit the light from the first semiconductor optical component 310 to the fiber array unit 340 via the second semiconductor optical component 320. For example, the light may include a spontaneous emission or a stimulated emission from the first semiconductor optical component 310.

Figure 3B:
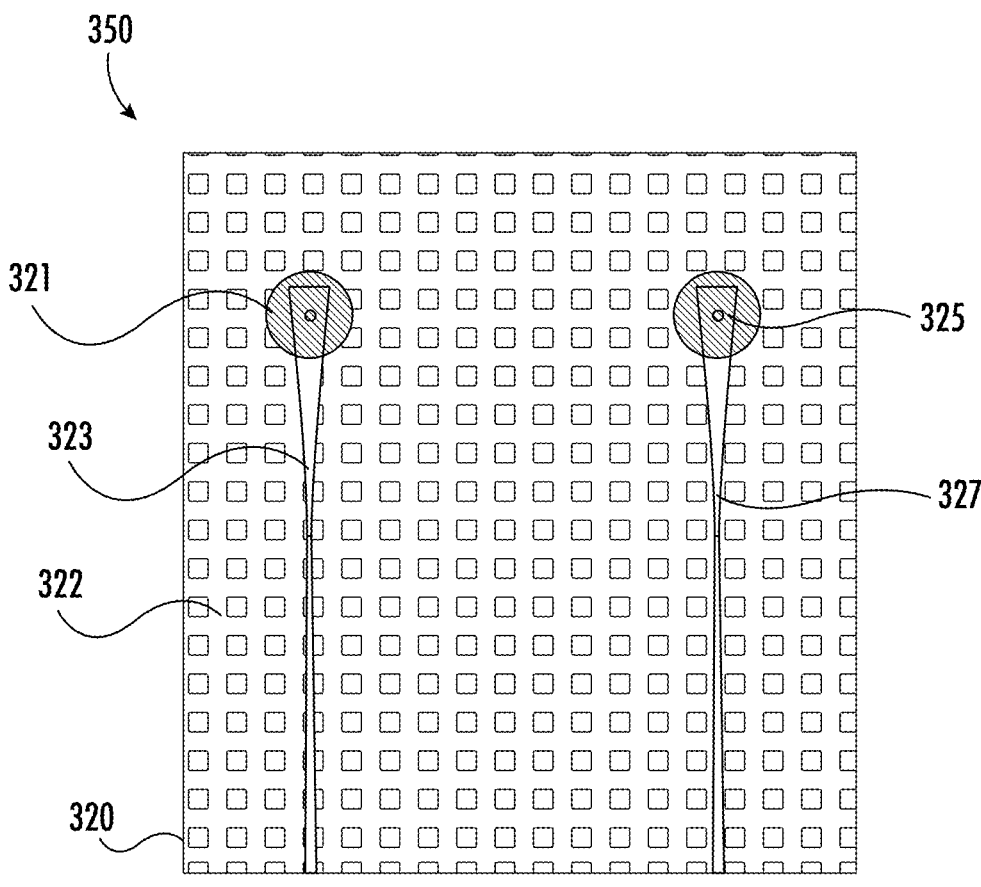
FIG. 3B depicts a portion of the example optical system for the LIDAR system of FIG. 3A, according to some implementations of the disclosure.

Referring to FIG. 3B, an expanded view of portion 350 shown in FIG. 3A is illustrated. In some implementations, the second semiconductor optical component 320 may include one or more on-chip features which are configured to emit the light received from the first semiconductor optical component 310 in the out-of-plane direction toward the FAU 340. For example, the one or more on-chip features may include one or more optical components, such as but not limited to grating couplers. The one or more grating couplers can be disposed or provided at a surface of the second semiconductor optical component 320 adjacent to the FAU 340. The FAU 340 can include one or more channels to respectively receive the light emitted from the one or more grating couplers. As illustrated in FIG. 3B, the second semiconductor optical component 320 can include a plurality of on-chip features 321, 325 and the FAU 340 can include a plurality of channels to respectively receive the light (e.g., light beams 323, 327) emitted from the plurality of on-chip features 321, 325 (e.g., comprising grating couplers). For example, FAU 340 can include at least one first channel positioned to receive light beam 323 emitted out of plane by on-chip feature 321 and at least one second channel positioned to receive light beam 327 emitted out of plane by on-chip feature 325. In some implementations, the light can be emitted from each of the grating couplers 321, 325 simultaneously. In some implementations, the light can be emitted from the grating couplers 321, 325 at different times (e.g., in a sequential manner). In some implementations, the light is emitted from the grating couplers 321, 325 at an angle which is tilted (e.g., non-perpendicular) to the first side or first surface 322 of the second semiconductor optical component 320.

The first semiconductor optical component 310 can be aligned with the second semiconductor optical component 320 based on a measurement of the light transmitted between the first semiconductor optical component 310 and the FAU 340 via the second semiconductor optical component 320. In the first implementation, the FAU 340 can be configured to measure an output (e.g., an output signal) associated with the light transmitted from the first semiconductor optical component 310 and emitted out of plane from the second semiconductor optical component 320 in the direction to the FAU 340. In some implementations, the alignment system 300 (e.g., via one or more processors) may be configured to determine a particular position of the second semiconductor optical component 320 relative to the first semiconductor optical component 310 which is associated with an optimized value measured from the output of the light. For example, the optimized value may correspond to a maximum peak signal value among peak values associated with the measured output signal while moving the second semiconductor optical component 320.

In some implementations, the alignment system 300 may be configured to move the second semiconductor optical component 320 relative to the first semiconductor optical component 310 while the FAU 340 measures the output signal associated with the light emitted out of plane from the second semiconductor optical component 320 in the direction toward the FAU 340. While the second semiconductor optical component 320 is moved, the alignment system 300 (e.g., via one or more processors) can determine the maximum peak value of the output of the light, where the maximum peak value is indicative of, or associated with, a particular position of the second semiconductor optical component 320 being aligned with the first semiconductor optical component 310. The alignment system 300 can be configured to align the first semiconductor optical component 310 with the second semiconductor optical component 320 at the particular position. In some implementations, an active alignment stage or machine (e.g., part of the alignment system 300) can be configured to move the second semiconductor optical component 320 along multiple degrees of freedom (e.g., three to six degrees), to adjust the position of the second semiconductor optical component 320 through one to three axes (e.g., x, y, and z axes) and/or one to three rotational directions (e.g., yaw, pitch, and roll). For example, the alignment system 300 may be configured to accurately align one or multiple channel light or waveguides from the first semiconductor optical component 310 into the waveguides of the second semiconductor optical component 320 based on the measurement of the output.

In some implementations, after aligning the first semiconductor optical component 310 with the second semiconductor optical component 320, the alignment system 300 (e.g., via the one or more processors) may be configured to control the vacuum component 330 to release the suction force applied to the second semiconductor optical component 320. For example, the suction force can be reduced gradually so that the alignment between the first semiconductor optical component 310 and the second semiconductor optical component 320 is maintained (e.g., by reducing the suction force by less than a threshold suction force reduction rate).

In some implementations, after aligning the first semiconductor optical component 310 with the second semiconductor optical component 320, one or more bonding processes and/or one or more curing processes may be performed to further secure or couple the first semiconductor optical component 310 with the second semiconductor optical component 320. For example, the coupling material between the first semiconductor optical component 310 and the second semiconductor optical component 320 can be cured via a curing process (e.g., a UV curing process and/or a thermal curing process), to fully cure the coupling material between the first semiconductor optical component 310 and the second semiconductor optical component 320.

A second example process for aligning the first semiconductor optical component 310 with the second semiconductor optical component 320 may be similar to the first example process but performed in a reverse direction and can include the following operations. In a second implementation, the FAU 340 may be coupled to the light source 360 (e.g., a laser) which is configured to generate or emit light through the FAU 340 and to the second semiconductor optical component 320. For example, the light source 360 (e.g., a laser) may be configured to generate or emit light through the FAU 340 and to the second semiconductor optical component 320 in the second direction (e.g., the z-direction or a direction substantially parallel to the z-direction), which can be perpendicular or substantially perpendicular to the first direction (e.g., the x-direction or a direction substantially parallel to the x-direction). The light can be transmitted from the FAU 340 to the first semiconductor optical component 310 via the second semiconductor optical component 320. The second semiconductor optical component 320 may include one or more on-chip features (e.g., one or more grating couplers) which are configured to emit the light received from the FAU 340 in the first direction (e.g., an in-plane direction such as the x-direction or a direction substantially parallel to the x-direction) toward the first semiconductor optical component 310. The one or more grating couplers can be disposed or provided at a surface of the second semiconductor optical component 320 adjacent to the first semiconductor optical component 310 and/or at a surface of the second semiconductor optical component 320 adjacent to the FAU 340. The first semiconductor optical component 310 can include one or more channels or waveguides to respectively receive the light emitted from the second semiconductor optical component 320 (e.g., via one or more grating couplers). In some implementations, the second semiconductor optical component 320 includes a plurality of on-chip features and the first semiconductor optical component 310 includes a plurality of channels or waveguides. In some implementations, the light can be emitted from each of the grating couplers simultaneously or can be emitted at different times (e.g., in a sequential manner). In some implementations, the light is emitted from the grating couplers at an angle which is tilted (e.g., non-perpendicular) to the second side or second surface 324 of the second semiconductor optical component 320. In some implementations, when the vacuum component 330 and FAU 340 are disposed at a different surface or different side of the second semiconductor optical component 320 than that shown in FIG. 3A such as at the third side or third surface 326 of the second semiconductor optical component 320, the FAU 340 may be configured to transmit light (generated via the light source 360) from the FAU 340 to the second semiconductor optical component 320 along the first direction (e.g., the x-direction or a direction substantially parallel to the x-direction), and the light is transmitted from the second semiconductor optical component 320 to the first semiconductor optical component 310 along the first direction (e.g., the x-direction or a direction substantially parallel to the x-direction).

The first semiconductor optical component 310 can be aligned with the second semiconductor optical component 320 based on a measurement of the light transmitted between the first semiconductor optical component 310 and the FAU 340 via the second semiconductor optical component 320. In the second implementation the first semiconductor optical component 310 (or one or more processors associated with the alignment system 300) can be configured to measure an output (e.g., an output signal) associated with the light transmitted from the FAU 340 and emitted from the second semiconductor optical component 320 in the direction (e.g., an in-plane direction) toward the first semiconductor optical component 310. In some implementations, the alignment system 300 (e.g., via one or more processors) may be configured to determine a particular position of the second semiconductor optical component 320 relative to the first semiconductor optical component 310 which is associated with an optimized value measured from the output of the light. For example, the optimized value may correspond to a maximum peak signal value among peak values associated with the measured output signal while moving the second semiconductor optical component 320.

In some implementations, the alignment system 300 may be configured to move the second semiconductor optical component 320 relative to the first semiconductor optical component 310 while the first semiconductor optical component 310 (or one or more processors associated with the alignment system 300) measures the output signal associated with the light emitted from the second semiconductor optical component 320 in the direction toward the first semiconductor optical component 310. While the second semiconductor optical component 320 is moved, the alignment system 300 (e.g., via one or more processors) can determine the maximum peak value of the output of the light (e.g., relative to other light values measured while moving the second semiconductor optical component 320), where the maximum peak value is indicative of, or associated with, a particular position of the second semiconductor optical component 320 being aligned with the first semiconductor optical component 310. For example, the alignment system 300 may be configured to accurately align one or multiple channel light or waveguides from the second semiconductor optical component 320 into the waveguides of the first semiconductor optical component 310 based on the measurement of the output.

Similar to the first example process, after aligning the first semiconductor optical component 310 with the second semiconductor optical component 320, the alignment system 300 (e.g., via the one or more processors) may be configured to control the vacuum component 330 to release the suction force applied to the second semiconductor optical component 320.

Similar to the first example process, after aligning the first semiconductor optical component 310 with the second semiconductor optical component 320, one or more bonding processes and/or one or more curing processes may be performed to further secure or couple the first semiconductor optical component 310 with the second semiconductor optical component 320.

The disclosed alignment systems and methods for manufacturing the same can be implemented to ensure that the first semiconductor optical component 310 and the second semiconductor optical component 320 are securely and accurately coupled together, thereby improving the structural integrity of the optical components of the optical system for the LIDAR system. Further, according to the alignment systems and methods described herein, an alignment between semiconductor optical components can be improved compared to previous methods.

Described herein are methods for manufacturing a semiconductor-based LIDAR system for a vehicle, which can ensure that specification requirements are satisfied. As described in more detail herein, the method may be implemented to securely couple a plurality of semiconductor optical components for an optical system provided to the LIDAR system.

FIG. 4 is a flow diagram of an example, non-limiting method, according to one or more example embodiments of the disclosure.

The flow diagram of FIG. 4 illustrates a method 4100 for manufacturing a semiconductor-based LIDAR system for a vehicle, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. For example, the LIDAR system may correspond to the LIDAR system 200 of FIG. 2.

Referring to FIG. 4, at operation 4102, the method 4100 includes providing a first semiconductor optical component formed of a first semiconductor material. For example, the first semiconductor optical component can correspond to the first semiconductor optical component 310 as described with respect to FIGS. 3A-3B. The first semiconductor optical component 310 can include a semiconductor chip (e.g., a III-V semiconductor chip, a semiconductor optical amplifier, etc.) with one or more waveguides. In some implementations, the first semiconductor optical component 310 can include a semiconductor optical amplifier. The first semiconductor optical component 310 can be formed of a first semiconductor material.

At operation 4104, the method 4100 includes providing a second semiconductor optical component. For example, the second semiconductor optical component can correspond to the second semiconductor optical component 320 as described with respect to FIGS. 3A-3B. The second semiconductor optical component 320 can include a silicon photonics chip (e.g., a silicon interposer chip). The second semiconductor optical component 320 can be formed of a second semiconductor material.

At operation 4106, the method 4100 includes optically coupling a fiber array unit to the second semiconductor optical component. For example, the FAU 340 can be optically coupled to the second semiconductor optical component 320 via the light emitted by one or more on chip features of the second semiconductor optical component 320 which emit light toward the FAU 340. In some implementations, the second semiconductor optical component 320 may include other features to align the second semiconductor optical component 320 with the FAU 340 (e.g., markings such as fiducial marks disposed on the second semiconductor optical component 320).

At operation 4108, the method 4100 includes applying, by a vacuum component, a suction force to the second semiconductor optical component to couple the vacuum component to the second semiconductor optical component. Further, the fiber array unit can be coupled to the vacuum component. For example, the vacuum component can correspond to the vacuum component 330 as described with respect to FIGS. 3A-3B. The vacuum component 330 can be configured to apply a suction force (e.g., via suction hole 332) to a surface of the second semiconductor optical component 320 to couple the vacuum component 330 to the second semiconductor optical component 320, as described with respect to FIGS. 3A-3B. The FAU 340 can be coupled to the vacuum component 330 (e.g., via a coupling or bonding material). In some implementations, the suction force is applied to the second semiconductor optical component 320 after the FAU 340 is aligned with the second semiconductor optical component 320.

At operation 4110, the method 4100 includes aligning the first semiconductor optical component with the second semiconductor optical component based on a measurement of light transmitted between the first semiconductor optical component and the fiber array unit via the second semiconductor optical component. For example, in the alignment system 300 described with respect to FIGS. 3A-3B, the first semiconductor optical component 310 can be aligned with the second semiconductor optical component 320 based on a measurement of the light transmitted between the first semiconductor optical component 310 and the FAU 340 via the second semiconductor optical component 320. For example, the alignment system 300 may comprise one or more processors configured to measure light transmitted between the first semiconductor optical component 310 and the fiber array unit 340 via the second semiconductor optical component 320, and to control alignment of the first semiconductor optical component 310 with the second semiconductor optical component 320 based on the measured light. In the first implementation where light is transmitted from the first semiconductor optical component 310 to the FAU 340 via the second semiconductor optical component 320, the alignment system 300 (e.g., via one or more processors) may be configured to determine a particular position of the second semiconductor optical component 320 relative to the first semiconductor optical component 310 which is associated with an optimized value measured from the output of the light received at the FAU 340. In the second implementation where light is transmitted from the FAU 340 to the first semiconductor optical component 310 via the second semiconductor optical component 320, the alignment system 300 (e.g., via one or more processors) may be configured to determine a particular position of the second semiconductor optical component 320 relative to the first semiconductor optical component 310 which is associated with an optimized value measured from the output of the light received at the second semiconductor optical component 320 (e.g., while moving the second semiconductor optical component 320 along one or more degrees of freedom).

At operation 4112, the method 4100 includes mechanically coupling together the first semiconductor optical component 310 and the second semiconductor optical component 320 at the alignment position determined at operation 4110. For example, the first semiconductor optical component 310 and the second semiconductor optical component 320 can be mechanically coupled together via a coupling material provided between the first semiconductor optical component 310 and the second semiconductor optical component 320. For example, the coupling or bonding material may be a polymer material such as an ultraviolet polymer material, an epoxy such as an ultraviolet epoxy, glue, etc. In operation 4112, one or more bonding processes and/or one or more curing processes may be performed to further secure or couple the first semiconductor optical component 310 with the second semiconductor optical component 320. For example, the coupling material between the first semiconductor optical component 310 and the second semiconductor optical component 320 can be cured via a curing process (e.g., a UV curing process and/or a thermal curing process), to fully cure the coupling material between the first semiconductor optical component 310 and the second semiconductor optical component 320.

FIG. 5 is a flow chart of an example, non-limiting computer-implemented method, according to one or more example embodiments of the disclosure.

The flow chart of FIG. 5 illustrates a method 5100 for controlling a vehicle, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 5100 may be an extension of the method of FIG. 4. However, in some implementations the method 5100 may be a standalone method (e.g., for testing or implementing a semiconductor optical device in a LIDAR system and/or for controlling a vehicle). Referring to FIG. 5, at operation 5102, the method 5100 includes providing the semiconductor optical device (e.g., which can comprise the first semiconductor optical component and the second semiconductor optical component coupled together via the method of FIG. 4, for example) within the LIDAR system. For example, the semiconductor optical device may be provided after performing the operations of FIG. 4 which can additionally include one or more curing processes (e.g., a UV curing process and/or a thermal curing process) and/or adhering processes for securing the first semiconductor optical component to the second semiconductor optical component after or while aligning the first semiconductor optical component to the second semiconductor optical component.

At operation 5104, the method 5100 includes directing a first light beam in a first direction toward an environment of the vehicle. For example, the first light beam may correspond to outgoing light transmitted via the transmitter 220 in FIG. 2 to the object 218.

At operation 5106, the method 5100 includes receiving a reflected light beam which corresponds to the first light beam reflected from the object in the environment and directing the reflected light beam in a second direction, different from the first direction, toward a receiver (e.g., receiver 222 in FIG. 2). For example, the reflected light beam may correspond to incoming light which has been reflected off object 218 which may be in an environment of the vehicle. Further, the incoming light may be directed toward receiver 222 in FIG. 2.

At operation 5108, the method 5100 includes determining one or more parameters of the object based on the reflected light beam. For example, as described herein, one or more of the parameters of the object (e.g., object 218) can be determined based on sensor data collected by the LIDAR system. For example, the LIDAR system may output sensor data 104 which can be processed by one or more sub-control system(s) 101 shown in FIG. 1 to determine the parameters of the object. For example, the parameters of the object can include map or location data associated with the object, distance information associated with the object, identification or classification information associated with the object, motion information associated with the object, etc.

At operation 5110, the method 5100 includes controlling a motion of the vehicle based on the one or more parameters of the object. For example, as described herein, one or more of the sub-control system(s) 101 shown in FIG. 1 can be implemented to control a motion of the vehicle based on the one or more parameters of the object (e.g., by generating a motion plan, by selecting a motion plan, by controlling braking, acceleration, and/or steering components of the vehicle, etc.).

Figure 6:
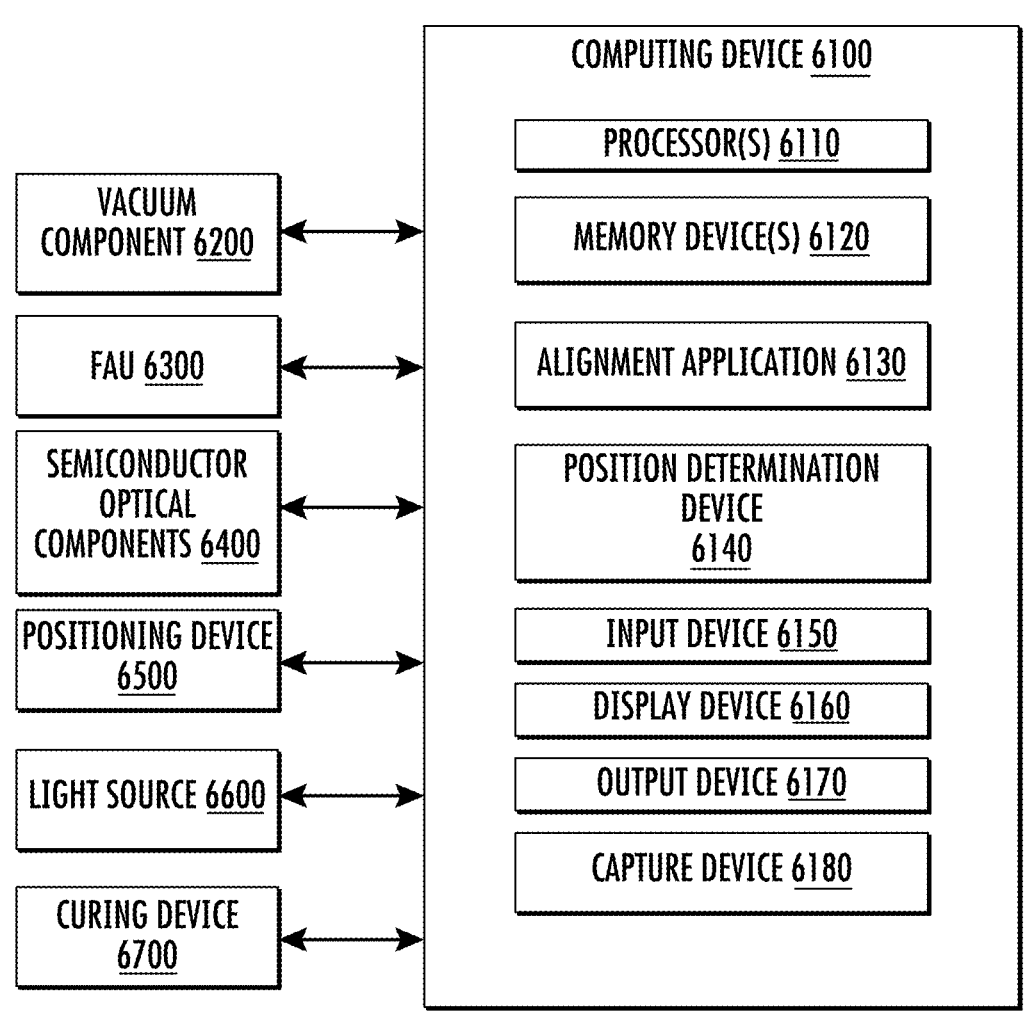
FIG. 6 depicts a block diagram of an example alignment system, according to some implementations of the disclosure.

FIG. 6 depicts a block diagram of an example alignment system, according to some implementations of the disclosure.

As illustrated in FIG. 6, an alignment system 6000 can include a computing device 6100, vacuum component 6200, FAU 6300, a plurality of semiconductor optical components 6400, a positioning device 6500, a light source 6600, and a curing device 6700. The vacuum component 6200, FAU 6300, and light source 6600 can correspond to the vacuum component 330, FAU 340, and light source 360 of FIG. 3A, respectively, and therefore a detailed description of these features will not be repeated for the sake of brevity. The plurality of semiconductor optical components 6400 can correspond to or include the first semiconductor optical component 310 and the second semiconductor optical component 320 of FIGS. 3A-3B, and therefore a detailed description of these features will also not be repeated for the sake of brevity. However, the disclosure is not limited to an alignment system in which only two semiconductor optical components are aligned with each other, as the alignment system 6000 could be utilized to align more than two semiconductor optical components with each other (e.g., by utilizing more than one vacuum component and more than one FAU, by utilizing a vacuum component that is configured to provide a suction force to a plurality of semiconductor optical components at the same time and a plurality of FAUs optically coupled to the plurality of semiconductor optical components, etc.).

Referring to FIG. 6, the computing device 6100 may include one or more processors 6110, one or more memory devices 6120, an alignment application 6130, a position determination device 6140, an input device 6150, a display device 6160, an output device 6170, and a capture device 6180.

For example, the one or more processors 6110 can be any suitable processing device that can be included in a computing device 6100. For example, the one or more processors 6110 may include one or more of a processor, processor cores, a controller and an arithmetic logic unit, a central processing unit (CPU), a graphics processing unit (GPU), a digital signal processor (DSP), an image processor, a microcomputer, a field programmable array, a programmable logic unit, an application-specific integrated circuit (ASIC), a microprocessor, a microcontroller, etc., and combinations thereof, including any other device capable of responding to and executing instructions in a defined manner. The one or more processors 6110 can be a single processor or a plurality of processors that are operatively connected, for example in parallel.

The one or more memory devices 6120 can include one or more non-transitory computer-readable storage mediums, including a Read Only Memory (ROM), Programmable Read Only Memory (PROM), Erasable Programmable Read Only Memory (EPROM), and flash memory, a USB drive, a volatile memory device including a Random Access Memory (RAM), a hard disk, floppy disks, a blue-ray disk, or optical media such as CD ROM discs and DVDs, and combinations thereof. However, examples of the one or more memory devices 6120 are not limited to the above description, and the one or more memory devices 6120 may be realized by other various devices and structures as would be understood by those skilled in the art.

For example, the one or more memory devices 6120 can store instructions, that when executed, cause the one or more processors 6110 to execute the alignment application 6130, and to execute the instructions to perform operations including: controlling the vacuum component 6200 to apply a suction force to the second semiconductor optical component 320 to couple the vacuum component 6200 to the second semiconductor optical component 320, thereby optically coupling the FAU 6300 to the second semiconductor optical component 320 when the vacuum component 6200 applies the suction force to the second semiconductor optical component 320, wherein the fiber array unit is coupled to the vacuum component 6200; and controlling the positioning device 6500 to align the first semiconductor optical component 310 with the second semiconductor optical component 320 based on a measurement of light transmitted between the first semiconductor optical component 310 and the FAU 6300 via the second semiconductor optical component 320, as described according to examples of the disclosure.

For example, the one or more memory devices 6120 can store instructions, that when executed, cause the one or more processors 6110 to execute the alignment application 6130, and to execute the instructions to perform operations including: controlling the vacuum component 6200 to apply a suction force to the second semiconductor optical component 320 to couple the vacuum component 6200 to the second semiconductor optical component 320, thereby causing the FAU 6300 to be optically coupled to the second semiconductor optical component 320 when the vacuum component 6200 applies the suction force to the second semiconductor optical component 320, wherein the FAU 6300 is coupled to the vacuum component 6200; monitoring or observing a measurement of light transmitted between the first semiconductor optical component 310 and the FAU 6300 via the second semiconductor optical component 320 while controlling the positioning device 6500 to move the second semiconductor optical component 320 relative to the first semiconductor optical component 310; and controlling the positioning device 6500 to align the second semiconductor optical component 320 with the first semiconductor optical component 310 based on the measurement of light, as described according to examples of the disclosure. For example, while the second semiconductor optical component is moved, the alignment application 6130 (e.g., via the one or more processors 6110) can determine a maximum peak of the output of the light, where the maximum peak is indicative of or associated with the first semiconductor optical component 310 being aligned with the second semiconductor optical component 320.

According to examples of the disclosure, the alignment application 6130 may be executed by the computing device 6100 to provide a user of the computing device 6100 a way to align the plurality of semiconductor optical components 6400, for example, for manufacturing an optical system that is disposed in a LIDAR system. The alignment application 6130 can provide, via the display device 6160 of the computing device 6100, a visual depiction of one or more of the vacuum component 6200, the FAU 6300, the plurality of semiconductor optical components 6400, the positioning device 6500, the light source 6600, and the curing device 6700.

In some implementations, the alignment application 6130 may be configured to utilize sensor data obtained by one or more sensors (e.g., at the computing device 6100 or elsewhere) to control the vacuum component 6200, the FAU 6300, the plurality of semiconductor optical components 6400, the positioning device 6500, the light source 6600, and the curing device 6700. For example, the sensor data can indicate a suction force of the vacuum component 6200, an amount of light received or transmitted at the FAU 6300 and/or one or more of the plurality of semiconductor optical components 6400, a position of one or more of the plurality of semiconductor optical components 6400, movement or motion information of the positioning device 6500, light output information of the light source 6600, temperature information associated with the curing device 6700, etc.

In some implementations, the alignment application 6130 may be configured to control the positioning device 6500. The positioning device 6500 may comprise an active alignment stage or machine which is configured to move the second semiconductor optical component 320 along multiple degrees of freedom (e.g., three to six degrees), to adjust the position of the second semiconductor optical component 320 through one to three axes (e.g., x, y, and z axes) and/or one to three rotational directions (e.g., yaw, pitch, and roll). For example, the alignment application 6130 may be configured to accurately align one or multiple channel light or waveguides from the first semiconductor optical component 310 into the waveguides of the second semiconductor optical component 320 based on the measurement of the output light at the FAU 6300 or the first semiconductor optical component 310.

In some implementations, the alignment application 6130 (e.g., via one or more processors 6110) may be configured to determine a particular position of the second semiconductor optical component 320 relative to the first semiconductor optical component 310 which is associated with an optimized value measured from the output of the light. For example, the optimized value may correspond to a maximum peak signal value among peak values associated with the measured output signal while moving the second semiconductor optical component 320.

In some implementations, after the first semiconductor optical component 310 is aligned with the second semiconductor optical component 320, the alignment application 6130 (e.g., via one or more processors 6110) may be configured to control the vacuum component 6200 to release the suction force applied to the second semiconductor optical component 320. For example, the suction force can be reduced gradually so that the alignment between the first semiconductor optical component 310 and the second semiconductor optical component 320 is maintained (e.g., by reducing the suction force by less than a threshold suction force reduction rate).

In some implementations, after the first semiconductor optical component 310 is aligned with the second semiconductor optical component 320, the alignment application 6130 (e.g., via one or more processors 6110) may be configured to control the curing device 6700 to perform one or more bonding processes and/or one or more curing processes to further secure or couple the first semiconductor optical component 310 with the second semiconductor optical component 320. For example, the curing device 6700 may include one or more heaters, one or more light sources (e.g., a UV light source), etc. The alignment application 6130 (e.g., via one or more processors 6110) may be configured to control the curing device 6700 to cure or heat the coupling material between the aligned first semiconductor optical component 310 and the second semiconductor optical component 320 via a curing process (e.g., a UV curing process and/or a thermal curing process), to fully cure the coupling material between the first semiconductor optical component 310 and the second semiconductor optical component 320.

In some example embodiments, the computing device 6100 includes a position determination device 6140. The position determination device 6140 can be any device or circuitry for analyzing the position of the computing device 6100 and/or of another component from the alignment system 6000. For example, the position determination device 6140 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining a position of the computing device 6100 and/or of other components from the alignment system 6000.

The computing device 6100 may include an input device 6150 configured to receive an input from a user and may include, for example, one or more of a keyboard (e.g., a physical keyboard, virtual keyboard, etc.), a mouse, a joystick, a button, a switch, an electronic pen or stylus, a gesture recognition sensor (e.g., to recognize gestures of a user including movements of a body part), an input sound device or speech recognition sensor (e.g., a microphone to receive a voice input such as a voice command or a voice query), a track ball, a remote controller, a portable (e.g., a cellular or smart) phone, a tablet PC, a pedal or footswitch, a virtual-reality device, and so on. The input device 6150 may further include a haptic device to provide haptic feedback to a user.

The input device 6150 may also be embodied by a touch-sensitive display having a touchscreen capability, for example. For example, the input device 6150 may be configured to receive inputs from a user associated with the computing device 6100 for executing the alignment application 6130 and controlling operations or functions of one or more of the vacuum component 6200, the FAU 6300, the plurality of semiconductor optical components 6400, the positioning device 6500, the light source 6600, and the curing device 6700.

The computing device 6100 may include a display device 6160 which displays information viewable by the user (e.g., a user interface screen). For example, the display device 6160 may be a non-touch sensitive display or a touch-sensitive display. The display device 6160 may include a liquid crystal display (LCD), a light emitting diode (LED) display, an organic light emitting diode (OLED) display, active matrix organic light emitting diode (AMOLED), flexible display, 3D display, a plasma display panel (PDP), a cathode ray tube (CRT) display, and the like, for example. However, the disclosure is not limited to these example displays and may include other types of displays. The display device 6160 may be configured to display information associated with operations for aligning and coupling the plurality of semiconductor optical components 6400 while executing the alignment application 6130.

The computing device 6100 may include an output device 6170 to provide an output to the user and may include, for example, one or more of an audio device (e.g., one or more speakers), a haptic device to provide haptic feedback to a user (e.g., a vibration device), a light source (e.g., one or more light sources such as LEDs which provide visual feedback to a user), a thermal feedback system, and the like. The output device 6170 may provide information associated with operations for aligning and coupling the plurality of semiconductor optical components 6400 while executing the alignment application 6130.

The computing device 6100 may include a capture device 6180 that is capable of capturing content, according to various examples of the disclosure. For example, the capture device 6180 can include an image capturer (e.g., a camera) which is configured to capture images (e.g., photos, video, and the like) of one or more of the components of the alignment system 6000. For example, the capture device 6180 can include a sound capturer (e.g., a microphone) which is configured to capture sound or audio (e.g., an audio recording). For example, in some implementations imagery may be used to align the plurality of semiconductor optical components 6400 while executing the alignment application 6130.

The foregoing describes the technology of this disclosure within the context of a LIDAR system and an autonomous vehicle for example purposes only. As described herein, the technology described herein is not limited to a LIDAR system or an autonomous vehicle and can be implemented for or within other systems, autonomous platforms, and other computing systems.

What is claimed is:

1. A method for manufacturing a semiconductor-based LIDAR system for a vehicle, the method comprising:
   providing a first semiconductor optical component and a second semiconductor optical component;
   optically coupling a fiber array unit to the second semiconductor optical component;
   applying, by a vacuum component, a suction force to the second semiconductor optical component to couple the vacuum component to the second semiconductor optical component, wherein the fiber array unit is coupled to the vacuum component;

transmitting light between the first semiconductor optical component and the fiber array unit via the second semiconductor optical component by:

transmitting the light from the first semiconductor optical component to the fiber array unit via the second semiconductor optical component, or transmitting the light from the fiber array unit to the first semiconductor optical component via the second semiconductor optical component; and aligning the first semiconductor optical component with the second semiconductor optical component based on a measurement of the light transmitted between the first semiconductor optical component and the fiber array unit via the second semiconductor optical component.

2. The method of claim 1, wherein when the light is transmitted from the first semiconductor optical component to the fiber array unit, the light is transmitted from the first semiconductor optical component to the fiber array unit via a grating coupler of the second semiconductor optical component provided at a surface of the second semiconductor optical component adjacent to the fiber array unit.

3. The method of claim 2, wherein the light is transmitted from the first semiconductor optical component to the second semiconductor optical component along a first direction and the light is transmitted from the second semiconductor optical component to the fiber array unit along a second direction, different from the first direction, via the grating coupler.

4. The method of claim 1, wherein the first semiconductor optical component is coupled to a first surface of the second semiconductor optical component and the vacuum component applies the suction force to a second surface of the second semiconductor optical component.

5. The method of claim 4, wherein the first surface of the second semiconductor optical component is perpendicular to the second surface of the second semiconductor optical component.

6. The method of claim 1, wherein when the light is transmitted from the first semiconductor optical component to the fiber array unit, the method further comprises:

measuring, at the fiber array unit, an output of the light transmitted from the first semiconductor optical component to the fiber array unit via the second semiconductor optical component, while moving the second semiconductor optical component;

determining a particular position of the second semiconductor optical component relative to the first semiconductor optical component which is associated with a relative maximum value from among a plurality of values measured from the output of the light; and aligning the first semiconductor optical component with the second semiconductor optical component at the particular position.

7. The method of claim 1, wherein when the light is transmitted from the first semiconductor optical component to the fiber array unit, the light is generated by the first semiconductor optical component and transmitted from the first semiconductor optical component to the fiber array unit via the second semiconductor optical component.

8. The method of claim 7, wherein the light generated by the first semiconductor optical component comprises a spontaneous emission from the first semiconductor optical component.

9. The method of claim 1, wherein when the light is transmitted from the first semiconductor optical component to the fiber array unit:

the second semiconductor optical component includes one or more on-chip features which emit the light out of plane with respect to the second semiconductor optical component in a direction toward the fiber array unit, and the aligning the first semiconductor optical component with the second semiconductor optical component based on the measurement of the light transmitted between the first semiconductor optical component and the fiber array unit via the second semiconductor optical component, comprises measuring an output signal associated with the light emitted out of plane with respect to the second semiconductor optical component in the direction toward the fiber array unit.

10. The method of claim 9, wherein the one or more on-chip features comprise a plurality of grating couplers and the fiber array unit comprises a plurality of channels to respectively receive the light emitted from the plurality of grating couplers.

11. The method of claim 1, wherein when the light is transmitted from the fiber array unit to the first semiconductor optical component, the light is transmitted from the fiber array unit to the first semiconductor optical component via a grating coupler of the second semiconductor optical component provided between the second semiconductor optical component and the fiber array unit.

12. The method of claim 11, wherein the light is transmitted from the fiber array unit to the second semiconductor optical component via the grating coupler along a first direction, and the light is transmitted from the second semiconductor optical component to the first semiconductor optical component along a second direction, different from the first direction.

13. The method of claim 1, wherein when the light is transmitted from the fiber array unit to the first semiconductor optical component, the method further comprises:

measuring, at the first semiconductor optical component, an output of the light transmitted from the fiber array unit to the first semiconductor optical component via the second semiconductor optical component, while moving the second semiconductor optical component relative to the first semiconductor optical component, and aligning the first semiconductor optical component with the second semiconductor optical component based on an optimized value measured from the output of the light while moving the second semiconductor optical component relative to the first semiconductor optical component.

14. The method of claim 1, further comprising, after aligning the first semiconductor optical component with the second semiconductor optical component, controlling the vacuum component to release the suction force applied to the second semiconductor optical component by reducing the suction force by less than a threshold suction force reduction rate.

15. The method of claim 1, wherein the first semiconductor optical component includes a semiconductor optical amplifier and the second semiconductor optical component includes a silicon photonics chip.

16. The method of claim 15, wherein the first semiconductor optical component is formed of a different semiconductor material than the second semiconductor optical component.

17. An alignment system for manufacturing a Light Detection and Ranging (LIDAR) system, comprising:

an optical system, comprising:

a first semiconductor optical component, and a second semiconductor optical component;

a vacuum component configured to apply a suction force to the second semiconductor optical component;

a fiber array unit coupled to the vacuum component and configured to be optically coupled to the second semiconductor optical component while the vacuum component applies the suction force to the second semiconductor optical component; and one or more processors configured to:

control a transmission of light between the first semiconductor optical component and the fiber array unit via the second semiconductor optical component by:

controlling the transmission of the light from the first semiconductor optical component to the fiber array unit via the second semiconductor optical component, or controlling the transmission of the light from the fiber array unit to the first semiconductor optical component via the second semiconductor optical component, measure the light transmitted between the first semiconductor optical component and the fiber array unit via the second semiconductor optical component, and control alignment of the first semiconductor optical component with the second semiconductor optical component based on the measured light.

18. The alignment system of claim 17, wherein the fiber array unit is integrated into the vacuum component.

19. A method for manufacturing a semiconductor-based LIDAR system for a vehicle, the method comprising:

providing a first semiconductor optical component and a second semiconductor optical component;

optically coupling a fiber array unit to the second semiconductor optical component;

applying, by a vacuum component, a suction force to the second semiconductor optical component to couple the vacuum component to the second semiconductor optical component, wherein the fiber array unit is coupled to the vacuum component;

aligning the first semiconductor optical component with the second semiconductor optical component based on a measurement of light transmitted between the first semiconductor optical component and the fiber array unit via the second semiconductor optical component; and after aligning the first semiconductor optical component with the second semiconductor optical component, controlling the vacuum component to release the suction force applied to the second semiconductor optical component by reducing the suction force by less than a threshold suction force reduction rate.

\* \* \* \* \*